United States Patent [19]
Iimura

[11] Patent Number: 5,936,921
[45] Date of Patent: Aug. 10, 1999

[54] OPTICAL DISC APPARATUS FOR RECORDING THE RF SIGNAL COMPONENT IN A DIFFERENCE SIGNAL WHICH CONTAINS BOTH SPEED AND TIME INFORMATION

[75] Inventor: Shinichiro Iimura, Kanagawa, Japan

[73] Assignee: Sony Corporation, Tokyo, Japan

[21] Appl. No.: 08/095,288

[22] Filed: Jul. 21, 1993

[30] Foreign Application Priority Data

Jul. 24, 1992 [JP] Japan ................................. 4-218648

[51] Int. Cl.⁶ .................................................. G11B 7/00
[52] U.S. Cl. ............................. 369/48; 369/50; 369/54
[58] Field of Search ................................. 369/47, 44.32, 369/44.26, 44.35, 44.36, 48, 54, 58, 124, 50

[56] References Cited

U.S. PATENT DOCUMENTS

| | | | |
|---|---|---|---|
| 4,375,088 | 2/1983 | de Haan et al. | 369/44.41 X |
| 4,471,477 | 9/1984 | Bierhoff | 369/44.36 X |
| 4,817,069 | 3/1989 | Shigemori | 369/44.29 X |
| 4,942,565 | 7/1990 | Lagadec | 369/59 |
| 5,150,346 | 9/1992 | Minakuchi | 369/44.36 |
| 5,185,732 | 2/1993 | Ogawa et al. | 369/47 |
| 5,253,239 | 10/1993 | Edahiro et al. | 369/44.29 X |
| 5,255,252 | 10/1993 | Katayama | 369/44.36 |
| 5,339,302 | 8/1994 | Takahashi et al. | 369/54 |
| 5,459,706 | 10/1995 | Ogawa et al. | 369/54 |

FOREIGN PATENT DOCUMENTS

| | | |
|---|---|---|
| 0 430 541 A2 | 6/1991 | European Pat. Off. . |
| 0 474 021 A3 | 3/1992 | European Pat. Off. . |
| 2 517 154 | 5/1983 | France . |
| 2 067 313 | 7/1981 | United Kingdom . |

OTHER PUBLICATIONS

Hansen, *A Head–Positioning System Using Buried Servos*, Nov. 1981.
Patent Abstracts of Japan, vol. 10, No. 212 (P–480)(2268), Jul. 24, 1986 & JP–A–61 050 228 (Pioneer Electronic Corp.).
Patent Abstracts of Japan, vol. 10, No. 225 (P–484)(2281), Aug. 6, 1986 & JP–A–61 059 634 (Toshiba Corp.).

*Primary Examiner*—W. R. Young
*Attorney, Agent, or Firm*—Limbach & Limbach L.L.P.

[57] ABSTRACT

An optical disc apparatus for recording/reproducing desired information, e.g. a "write once, read many times" optical disc system, is described. It is desired to securely detect speed information and address data recorded in a pregroove, even when the position of incidence of the light beam with respect to the light receiving element has been changed. Output signals of light receiving surfaces of an optical pickup adjacent to each other in the received radial direction of an optical disc have their relative signal levels corrected so that the signal levels of RF components mixed into these output signals are equalized to each other. A difference signal thereof is then generated to recover the speed information and address data.

8 Claims, 4 Drawing Sheets

OPTICAL DISC APPARATUS FOR RECORDING THE RF SIGNAL COMPONENT IN A DIFFERENCE SIGNAL WHICH CONTAINS BOTH SPEED AND TIME INFORMATION

BACKGROUND OF THE INVENTION

1. Field of the Invention

This invention relates to an optical disc apparatus for recording/reproducing and, more particularly, but not exclusively, to optical disc apparatus of the write once read many times type.

2. Description of the Prior Art

It is known to provide so-called write once, read many times optical discs so that desired information may be recorded and read. In at least some write once, read many times optical disc devices, a light beam is caused to illuminate an organic pigment type thin film to form pits whereby desired information may be recorded on a once only basis. By forming pits in this manner, reproduction by an ordinary compact disc player of this type of optical disc is possible. Accordingly, this type of optical disc may be conveniently used in cases where only a small quantity of discs capable of being reproduced by a compact disc player need be produced without having to prepare a stamper for each disc.

In this type of optical disc, a pregroove is formed at the pit forming position and time information (ATIP: absolute time in pregroove) is recorded in the pregroove. Thereby, in an optical disc device manipulating such a disc, desired information may be recorded/reproduced on the basis of such time information.

In addition, in this type of optical disc, a carrier signal at a frequency of 22.05 kHz is frequency-modulated by address data and the pregroove is wobbled (moved radially) by the resulting frequency-modulated signal. In the optical disc device, the reflected light from the optical disc is received at a light receiving element of which the light receiving surface is divided into two portions in the radial direction of the optical disc. By detecting the wobbling of the pregroove based on such received light, a spindle motor may be rotated to hold the reproduced carrier signal at the frequency of 22.05 kHz and thereby rotate the optical disc at a predetermined rotational speed. Furthermore, the optical disc device is adapted to detect the time information by demodulating the output signal of the light receiving element to yield address data.

In the output signal of the light receiving element, time information consisting of address data and speed information for driving the spindle motor may be securely detected before the forming of the pits which carry the recorded write once read many times information. However, after forming the pits, leakage of a signal component of the recorded information (hereinafter referred to as the RF component) into the output signal cannot be avoided due to the fact that the incident light upon the light receiving element is modulated by the pits. In addition, the frequency band of the RF component and that of speed and time information partially overlap as shown in FIG. 4 of the accompanying drawings.

Conventionally, in the optical disc device, a difference signal is generated from the output signals of the light receiving surfaces of the light receiving element, the light receiving surface of which is divided into the two portions to detect meandering of the groove. When the signal levels of the RF components are equal to each other in the two output signals, it is possible for them to cancel each other's RF component in the difference signal. In this case, speed information and time information may be securely detected.

However, the output signal levels of the light receiving surfaces may be different from one another in the optical disc device. In this case, the RF component cannot be completely removed due to the fact that the signal level of the RF component is different between the output signals, and therefore speed information and time information cannot be detected.

One possibility for solving this problem, would be that in which a variable resistance, for example, is adjusted to adjust the two output signal levels. However, the incident position of the light beam with respect to the light receiving element in an optical disc device may change due to temperature change and/or aged deterioration. Accordingly, in this case, though speed information and time information may be securely detected directly after such adjustment, it will eventually become impossible to detect speed information and time information. Further, when the signal level of the RF component is changed between the output signals due to tracking errors during reproduction, removing of the RF component is likewise impossible.

U.S. Pat. No. 4,942,565 discloses an optical disc apparatus of the type using wobbling of the track to store control information for the operation of the apparatus.

U.S. Pat. No. 5,185,732 discloses an optical disc device in which track width is used to store information.

It is an object of the present invention to provide an optical disc device in which speed information and time information recorded in the pregroove may be securely detected even in such cases where the incident position of the light beam with respect to the light receiving element changes.

SUMMARY OF THE INVENTION

The present invention provides an optical disc apparatus for detecting meandering of a pregroove of an optical disc, said pregroove meandering on the basis of control information for use in recording/reproducing a desired information signal from said optical disc, said optical disc apparatus comprising:

(i) a light source for emitting a light beam;
(ii) an optical system for concentrating said light beam onto an information recording surface of said optical disc and for receiving reflected light of said light beam;
(iii) a light receiving element having a light receiving surface divided into at least first and second light receiving surfaces in a radial direction of said optical disc, said light receiving element receiving said reflected light at said optical system and outputting first and second output signals respectively from said first and second light receiving surfaces;
(iv) difference signal generation means for generating a difference signal from between said first and second output signals; and
(v) information detection means for detecting said control information from said difference signal; the improvement comprising
said difference signal generation means being responsive to said first and second output signals for correcting relative signal levels of said first and second output signals so as to substantially equalize signal levels of said information signal mixed into said first and second output signals.

According to the above, for each of the output signals of the light receiving surfaces adjacent to each other in the radial direction of the optical disc, the signal level of the RF component mixed into each output signal is detected. The relative signal levels of the output signals are then corrected so that the signal levels of RF components therein are equalized to each other and then a difference signal thereof is obtained. Thus, mixing of RF components into the wobble signal may be reduced, and even when the position of incidence of the light beam with respect to the light receiving element has been changed, speed information and address data recorded in the pregroove may still be securely detected.

BRIEF DESCRIPTION OF THE DRAWINGS

The above, and other objects, features and advantages of the invention will be apparent from the following detailed description of an illustrative embodiment which is to be read in connection with the accompanying drawings, in which.

DESCRIPTION OF THE PREFERRED EMBODIMENT

Figure 1:
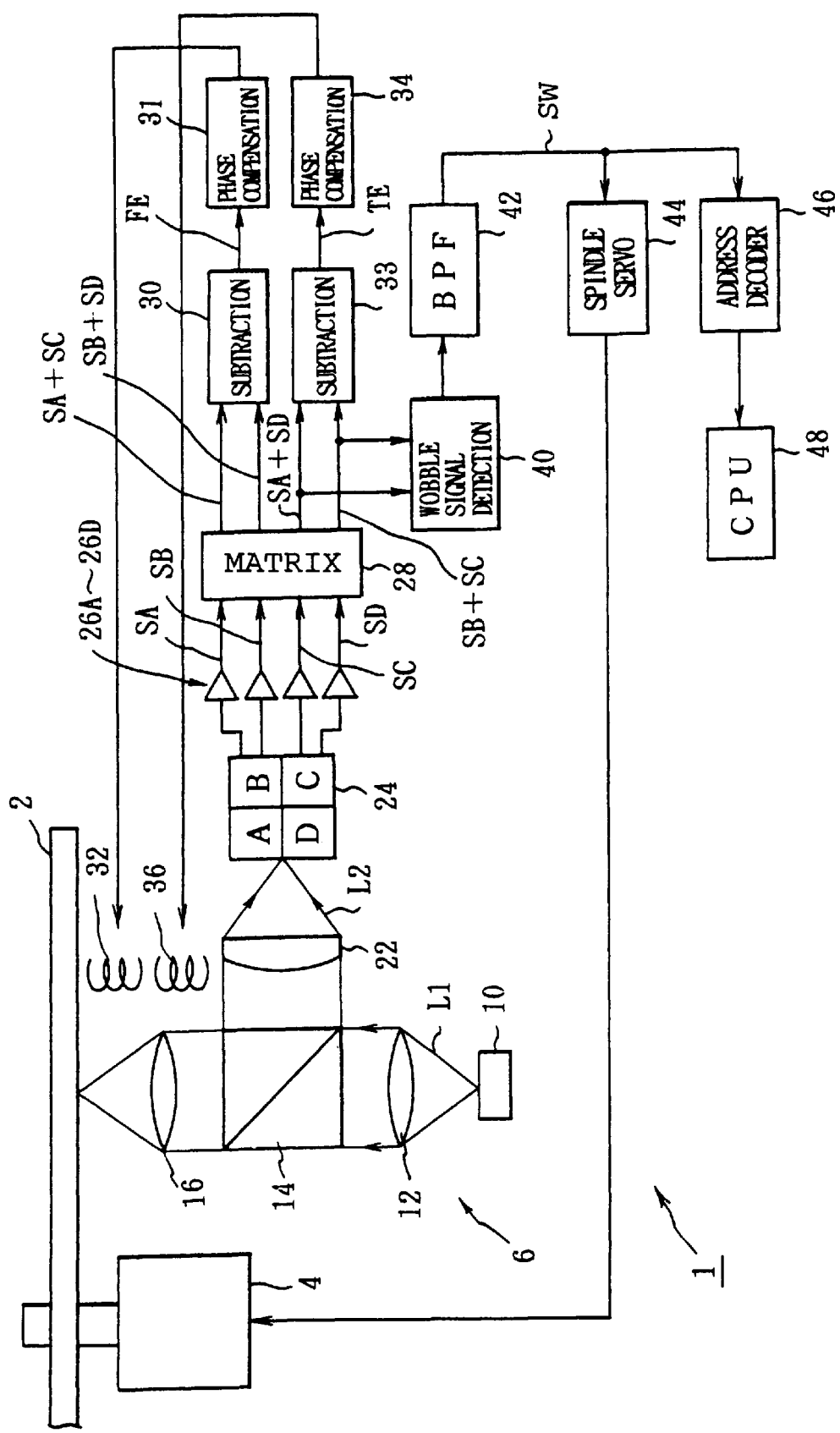
FIG. 1 is a block diagram showing an optical disc apparatus.

Referring to FIG. 1, generally denoted by numeral 1 is an optical disc apparatus which records desired information on a write once, read many times optical disc 2.

The optical disc apparatus 1 drives the spindle motor 4 to rotate the optical disc 2 at a predetermined rotational speed and, in this state, drives an optical pickup 6 to record/reproduce the desired information.

In the optical pickup 6, a laser diode 10 is driven on the basis of a driving signal output from a driver and a light beam L1 emitted from the laser diode 10 is converted into a collimated beam at a lens 12. The light beam L1 is then guided to an objective lens 16 through a beam splitter 14 and it is concentrated on the optical disc 2 by the objective lens 16. Thus, the light beam L1 of the laser diode 10 is concentrated onto the optical disc 2 to record/reproduce desired information.

Meanwhile, a portion of the light beam L1 is reflected at the beam splitter 14 to be incident upon an output light receiving element (not shown). Thus, the optical disc device 1 may control the quantity of the light beam L1 on the basis of the output signal of the output light receiving element.

Reflected light L2 from the optical disc 2 is received by the optical disc pickup 6 at the objective lens 16 and is directed to the beam splitter 14 to be reflected. The reflected light L2 then passes to a cylindrical lens 22 which concentrates the light onto a light receiving element 24.

The light receiving element 24 has a light receiving surface A to D that is divided into two portions in the radial direction of the optical disc 2 as received through the optical system of the optical pickup 6. The light receiving surface A to D is further divided into two in the direction perpendicular to this direction. Output signals SA to SD respectively of the light receiving surfaces A to D are output to a matrix circuit 28 through amplifiers 26A to 26D.

The matrix circuit 28 generates a focus error signal FE by obtaining addition signals SA+SC and SB+SD between diagonally arranged light receiving surfaces and by obtaining a difference signal between the addition signals SA+SC and SB+SD with a subtracter 30.

The focus error signal FE is delivered to a phase compensation circuit 31 to drive a focus actuator 32 so that the signal level of the focus error signal FE is brought to a "0" level, thereby effecting focus control.

The matrix circuit 28 also obtains addition signals SA+SD and SB+SC of the output signals SA to SD with respect to the light receiving surfaces A, D and B, C which are adjacent to each other in the radial direction of the optical disc 2. The addition signals SA+SD and SB+SC are delivered to a subtracter 33. The subtracter 33 then generates a tracking error signal TE by obtaining a difference signal between the addition signals SA+SD and SB+SC and delivers the tracking error signal TE to a phase compensation circuit 34. A tracking actuator 36 is driven so as to bring the signal level of the tracking error signal TE to a "0" level, thereby effecting tracking control.

The optical disc device 1 also delivers the addition signals SA+SD and SB+SC to a wobble signal detection circuit 40, where a difference signal between the addition signals SA+SD and SB+SC is generated by suppressing the RF signal components to generate a wobble signal SW of which the signal level varies correspondingly to wobbling of the pregroove.

A band-pass filter circuit (BPF) 42 detects the carrier signal component at the frequency of 22.05 kHz from the wobble signal SW and delivers the detected result to a spindle servo circuit 44. Thus, the spindle motor 4 is driven so as to maintain the frequency of the carrier signal component at a frequency of 22.05 kHz, and thereby keep the rotational speed of the optical disc 2 at a certain value.

Meanwhile, an address decoder 46 detects frequency-modulated address data by demodulating the wobble signal SW and delivers the detected result to a central processing unit (CPU) 48. Thus, desired information may be recorded/reproduced on the basis of time information represented by such address data.

Figure 2:
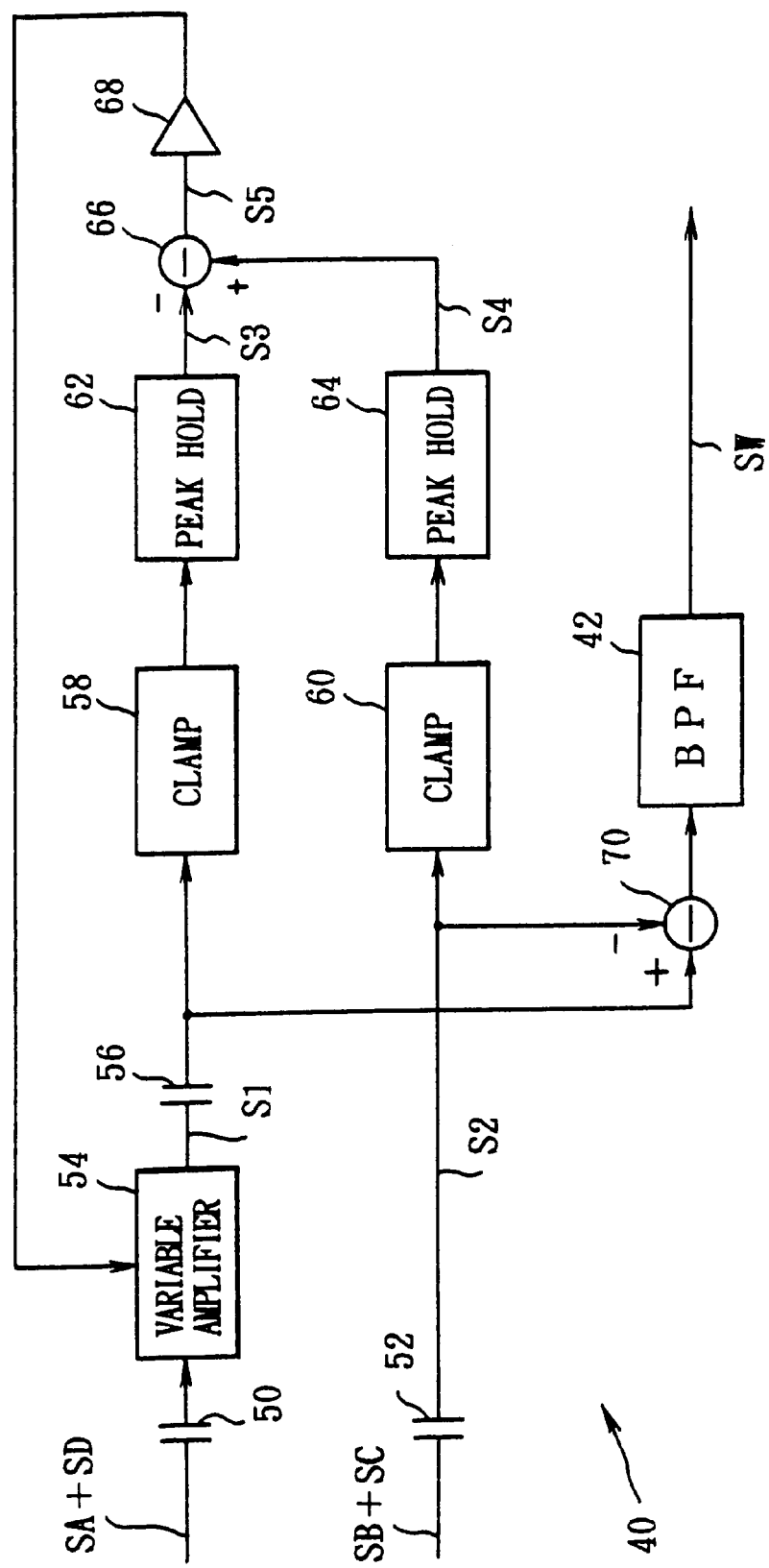
FIG. 2 is a block diagram showing a wobble signal detection circuit.
Figure 3A:
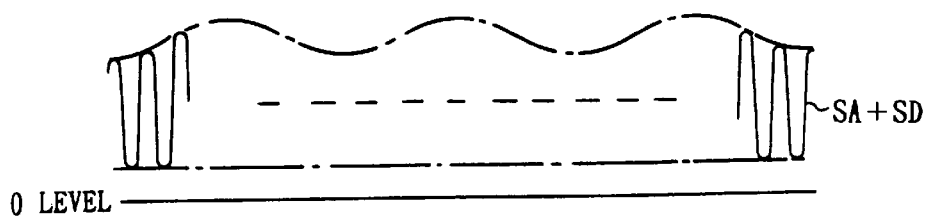
FIG. 3 (including subparts A–G) is a diagram of signal waveform explanatory of the operation of the apparatus and circuit of FIGS. 1 and 2.
Figure 3B:
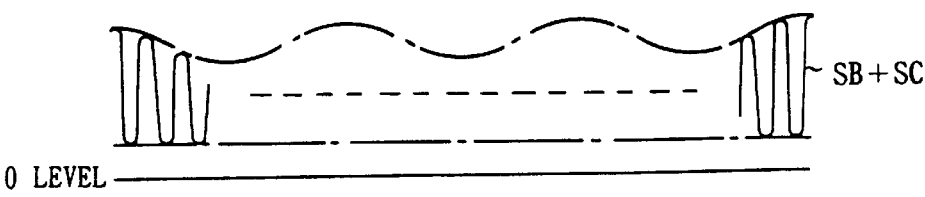
Figure 3C:
Figure 3D:
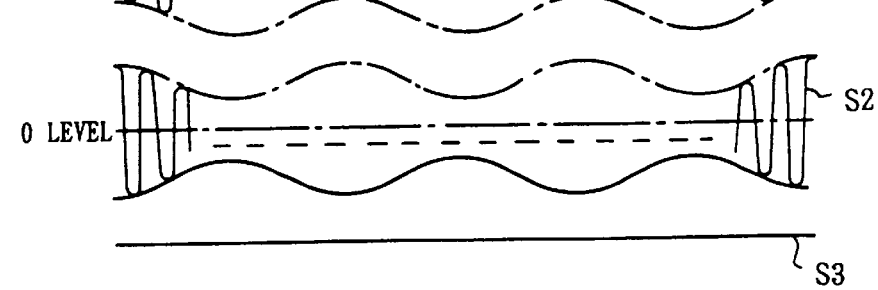
Figure 3E:
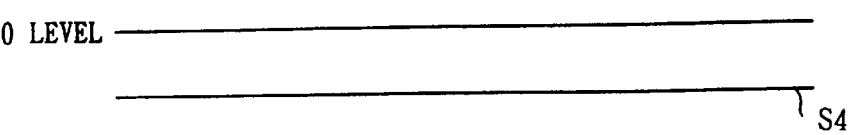
Figure 3F:
Figure 3G:
Figure 4:
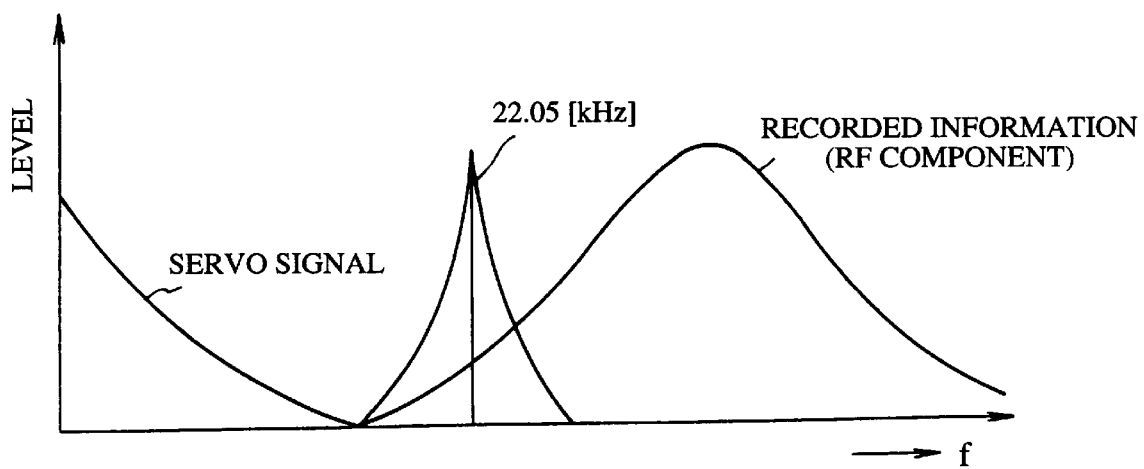
FIG. 4 shows curves indicating spectral characteristics of recorded/reproduced signals.

The wobble signal detection circuit 40 is shown in more detail in FIG. 2. The signal level of the addition signal SA+SD is corrected so that the RF components (consisting in this embodiment of an addition signal SA+SB+SC+SD obtained by adding the output signals of the light receiving surfaces A to D) mixed into the two addition signals SA+SD and SB+SC are equalized to each other. A difference signal is then generated between the addition signals SA+SD and SB+SC so that the RF components are not mixed into the wobble signal SW.

As shown in FIG. 3, at the wobble signal detection circuit 40, addition signals SA+SD and SB+SC (FIG. 3, (A) and (B)) are input through coupling capacitors 50 and 52 and, of these, the addition signal SA+SD is output to a variable amplifier 54.

The addition signals SA+SD and SB+SC represent the quantity of the reflected light beam L2; this varies within a predetermined range according to pits and meandering of the groove in the radial direction of the optical disc 2. For this reason, the signal levels vary periodically at a high frequency corresponding to the pits in a manner biased by a predetermined level and the overall signal level fluctuates corresponding to the meandering of the groove.

Thus, the input signals S1 and S2 which have passed through the coupling capacitors 50 and 52 vary about a "0" level (FIG. 3, (C) and (D)). The input signal S1 of these is amplified by a predetermined gain at the variable amplifier 54.

The wobble signal detection circuit 40 delivers the output signal S1 of the variable amplifier 54 to a clamping circuit 58 through a coupling capacitor 56 and delivers the input signal S2 to a clamping circuit 60. The output signals of the clamping circuits 58 and 60 passes to peak hold circuits 62 and 64 to thereby detect envelope signals S3 and S4 (FIG. 3, (E) and (F)) of the input signals S1 and S2. By clamping the input signals S1 and S2 at the clamping circuits 58 and 60 and then detecting the envelope signals S3 and S4 at the peak hold circuits 62 and 64, the wobble signal detection circuit 40 is adapted to detect the envelope signals S3 and S4 by effectively using the dynamic range of the peak hold circuits 62 and 64.

The wobble signal detection circuit 40 then generates a difference signal S5 between the envelope signals S3 and S4 at the subtracter 66 and feeds this difference signal S5 back to the variable amplifier 54 via an amplifier 68.

Thus, at the variable amplifier 54, gain is adjusted/controlled so that the signal levels of RF components varying according to the pits are equalized to each other between the input signals S1 and S2, thereby correcting the signal level of the input signal S1.

The wobble signal detection circuit 40 obtains a difference signal SW (FIG. 3, (G)) between the output signal S1 of the variable amplifier 54 and the input signal S2 at a subtracter 70. By outputting the difference signal SW through the band-pass filter circuit 42, a wobble signal SW is generated.

In this manner, after correcting the signal level of the input signal S1 so that the signal levels of RF components varying according to pits are equalized to each other between the input signals S1 and S2, the difference signal SW is generated. Thereby, even when the position of incidence of the reflected light beam L2 with respect to the light receiving element 24 has been changed, for example due to aging, it is possible to reduce erroneous mixing of the RF component into the wobble signal SW. Accordingly, the speed information may be securely detected at the spindle servo circuit 44, the spindle motor may be securely driven, and address data may be securely detected at the address decoder 46.

It should be noted that, while, in the above described embodiment, a description has been given with respect to a case where peak hold is effected after clamping the input signals S1 and S2 at the clamping circuits 58, 60, the present invention is not limited to this and the clamping circuit may be omitted as required.

Further, while, in the above described embodiment, a description has been given with respect to a case where the signal level is corrected at the variable amplifier, the present invention is not limited to this and the signal level may be corrected using a multiplier. Further it is also possible to correct the signal level with respect to both the input signals S1 and S2.

As has been described, an optical disc device may be obtained, in which, for the output signals of the light receiving surfaces adjacent to each other in the radial direction of the optical disc, the signal level of the output signal is corrected so that the signal levels are equalized of RF components mixed into the output signals; a difference signal between these output signals is then generated so that mixing of RF components into the wobble signal may be reduced; thereby, for example, even when the position of incidence of the light beam with respect to the light receiving element has been changed, speed information and time information recorded in the pregroove may be securely detected.

In summary, FIG. 1 illustrates apparatus 1 in which time information or speed information is detected by detecting meandering of a pregroove with respect to an optical disc 2 on which the pregroove is caused to meander based on time information or speed information, so as to record/reproduce a desired information signal on/from the optical disc 2 on the basis of the detected result SW, comprising: a light source 10 for emitting a light beam L1; optical systems 12, 14, 16, 22 for concentrating the light beam L1 onto the information recording surface and for receiving reflected light L2 of the light beam L1; a light receiving element 24 having a light receiving surface divided in the radial direction of the optical disc 2 into first and second light receiving surfaces A, D and B, C receiving the reflected light L2 received at the optical systems 12, 14, 16, 22 and outputting first and second output signals SA+SD and SB+SC respectively from the first and second light receiving surfaces A,D and B,C; a difference signal generation means 40 for detecting the difference signal SW between the first and second output signals SA+SD and SB+SC; and an information detection means 46 for detecting the speed information or the time information from the difference signal SW; and wherein the difference signal generation means 40 generates the difference signal SW after correcting the signal level of the first and/or second output signal SA+SD and/or SB+SC such that the signal levels of an information signal mixed into the first and second output signals SA+SD and SB+SC are substantially equalized to each other.

Further, the difference signal generation means 40 detects envelopes S3 and S4 of first and second output signals SA+SD and SB+SC and corrects the signal level of the first and/or second output signal SA+SD and/or SB+SC on the basis of the envelopes S3 and S4. Thereby, the signal level of the first and/or second output signal SA+SD and/or SB+SC is corrected such that the signal levels of the information signal mixed into the first and second output signals SA+SD and SB+SC are substantially equalized to each other.

Furthermore, in the present invention, the difference signal generation means 40 clamps the first and second output signals SA+SD and SB+SC at clamping circuits 58, 60 and then peak-hold them at peak-hold circuits 62, 64 to detect the envelopes S3 and S4 of the first and second output signals SA+SD and SB+SC.

The difference signal SW is generated after correcting the signal level of the first and/or second output signal SA+SD and/or SB+SC such that the signal levels of the information signal mixed into the first and second output signals SA+SD and SB+SC are substantially equalized to each other. Thereby, the amount of the information signal mixed into the difference signal SW may be reduced even where the incident position of the light beam with respect to the light receiving element 24 has been changed.

The envelopes S3 and S4 of the first and second output signals SA+SD and SB+SC are detected and the signal level of the first and/or second output signal SA+SD and/or SB+SC is corrected on the basis of the envelopes S3 and S4. Thereby, the signal level of the first and/or second output signal SA+SD and/or SB+SC may be corrected such that the signal levels of the information signal mixed into the first and second output signals SA+SD and SB+SC are substantially equalized to each other. The first and second output signals SA+SD and SB+SC are clamped at the clamping circuits 58, 60, and are then peak-held at the peak-hold circuits 62, 64. Thus, the envelopes S3 and S4 may be detected of the first and second output signals SA+SD and SB+SC.

Although an illustrative embodiment of the invention has been described in detail herein with reference to the accompanying drawings, it is to be understood that the invention is not limited to this precise embodiment, and that various changes and modifications can be effected therein by one skilled in the art without departing from the scope and spirit of the invention as defined by the appended claims.

I claim:

1. An optical disc apparatus for detecting meandering of a pregroove of an optical disc, the pregroove meandering on the basis of control information for use in recording/reproducing a desired information signal from the optical disc, the optical disc apparatus comprising:

(i) a light source for emitting a light beam;
   (ii) an optical system for concentrating the light beam onto an information recording surface of the optical disc, and for receiving reflected light of the light beam from the information recording surface;
   (iii) a light receiving element having a light receiving surface divided into at least first and second light receiving surfaces in a radial direction of the optical disc, the light receiving element receiving the reflected light from the optical system and outputting first and second output signals, respectively, from the first and second light receiving surfaces, the first and second output signals each having an RF signal component;
   (iv) difference signal generation means for substantially equalizing the signal levels of the RF signal components in the first and second output signals, and for combining the equalized signals to produce a difference signal so that the RF signal components are substantially removed from the difference signal; and
   (v) information detection means for detecting the control information from the difference signal.

2. An optical disc apparatus according to claim 1, wherein the difference signal generation means includes means for detecting the envelopes of the first and second output signals and and for correcting the relative signal levels of the first and second output signals on the basis of the envelopes.

3. An optical disc apparatus according to claim 2, wherein the difference signal generation means further includes:
   a first clamping circuit for clamping the first output signal;
   a second clamping circuit for clamping the second output;
   a first peak holding circuit for detecting the envelope of the first clamped output signal; and
   a second peak holding circuit for detecting the envelope of the second output signal.

4. An optical disc apparatus according to claim 1, wherein said control information comprises time information.

5. An optical disc apparatus according to claim 1, wherein said control information comprises speed information.

6. A method for detecting meandering of a pregroove of an optical disc, the pregroove meandering on the basis of control information for use in recording/reproducing a desired information signal from the optical disc, the method comprising the steps of:

emitting a light beam;
   concentrating the light beam onto an information recording surface of the optical disc;
   receiving reflected light of the light beam from the information recording surface;
   outputting a first output signal in response to the intensity of a first portion of the received reflected light;
   outputting a second output signal in response to the intensity of a second portion of the received reflected light, the first and second output signals each having an RF signal component;
   substantially equalizing the signal levels of the RF signal components in the first and second output signals;
   combining the equalized signals to produce a difference signal so that the RF signal components are substantially removed from the difference signal; and
   detecting the control information from the difference signal.

7. An optical disc apparatus for detecting meandering of a pregroove of an optical disc, the pregroove meandering on the basis of control information for use in recording/reproducing a desired information signal from the optical disc, the optical disc apparatus comprising:

a light source for emitting a light beam;
   an optical system for concentrating the light beam onto an information recording surface of the optical disc, and for receiving reflected light of the light beam from the information recording surface;
   a light receiving element having a light receiving surface divided into at least first and second light receiving surfaces in a radial direction of the optical disc, the light receiving element receiving the reflected light from the optical system and outputting first and second output signals, respectively, from the first and second light receiving surfaces, the first and second output signals each having an RF signal component; and
   a wobble signal detection circuit that alters the signal level of the RF signal component of at least one of the first and second output signals so that the signal levels of the RF signal components of the first and second output signals are substantially equivalent, and that combines the first and second output signals with the substantially equivalent RF signal components to produce a difference signal so that the RF signal components are substantially removed from the difference signal.

8. The optical disc of claim 7, wherein the wobble signal detection circuit includes:
   a first peak holding circuit for detecting the envelope of the first output signal; and
   a second peak holding circuit for detecting the envelope of the second output signal.

* * * * *